United States Patent
Parla et al.

(10) Patent No.: US 9,032,506 B2
(45) Date of Patent: May 12, 2015

(54) MULTIPLE APPLICATION CONTAINERIZATION IN A SINGLE CONTAINER

(75) Inventors: Vincent E. Parla, North Hampton, NH (US); Brian Henry Pescatore, Mansfield, MA (US); Timothy Steven Champagne, Attleboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/570,724

(22) Filed: Aug. 9, 2012

(65) Prior Publication Data

US 2014/0047535 A1 Feb. 13, 2014

(51) Int. Cl.
G06F 9/00 (2006.01)
H04L 29/06 (2006.01)

(52) U.S. Cl.
CPC .......... *H04L 63/164* (2013.01); *Y10S 379/901* (2013.01)

(58) Field of Classification Search
CPC ............ G06F 21/6218; H04L 63/0272; H04L 63/164; H04L 63/20; H04L 67/1097; H04W 12/08
See application file for complete search history.

(56) References Cited

U.S. PATENT DOCUMENTS

| | | | |
|---|---|---|---|
| 8,010,679 B2 * | 8/2011 | Low et al. ..................... | 709/227 |
| 2004/0158705 A1 * | 8/2004 | Burdett et al. ................ | 713/151 |
| 2006/0282889 A1 * | 12/2006 | Brown et al. ................... | 726/15 |
| 2007/0074283 A1 * | 3/2007 | Croak et al. ................... | 726/15 |
| 2008/0043761 A1 * | 2/2008 | Kumar et al. ................. | 370/401 |
| 2008/0046994 A1 * | 2/2008 | Venkatraman et al. ......... | 726/15 |
| 2009/0193513 A1 * | 7/2009 | Agarwal et al. ................ | 726/15 |
| 2010/0011447 A1 * | 1/2010 | Jothimani ....................... | 726/27 |
| 2010/0154028 A1 * | 6/2010 | Wainner et al. .................... | 726/1 |
| 2012/0005746 A1 * | 1/2012 | Wei et al. ......................... | 726/15 |
| 2012/0023570 A1 * | 1/2012 | Gorodyansky .................. | 726/12 |

OTHER PUBLICATIONS

TMCnet.com: MobileIron, Mobile Device Management "Sandbox Approach to Mobile Device Management Leaves Much to be Desired" Jun. 27, 2011.

* cited by examiner

*Primary Examiner* — Shewaye Gelagay
*Assistant Examiner* — Khoi Le
(74) *Attorney, Agent, or Firm* — Patterson + Sheridan, LLP

(57) ABSTRACT

Described in an example embodiment herein is a Multiple Application Container. Various embodiments of the Multiple Application Container may include, but are not limited to: (1) managed intranet access via a dedicated Virtual Private Network (VPN) tunnel shared amongst applications within the container, (2) managed file/data encryption, (3) native look and feel applications for the base Operating System (OS), (4) isolation from any non-OS based services on the device, and/or (5) Mobile Device Management (MDM) based capabilities, such as policy enforcement.

18 Claims, 4 Drawing Sheets

MULTIPLE APPLICATION CONTAINERIZATION IN A SINGLE CONTAINER

TECHNICAL FIELD

The present disclosure relates generally to mobile device security.

BACKGROUND

With the growth in mobile devices and mobile device Operating Systems, (e.g., iPads and Android Tablets), there is pressure on IT (Information Technology) administrators to allow access of these devices to the corporate network while maintaining some level of security and policy enforcement. At the same time, it is difficult to provide software solutions on these devices because the Operating Systems allow limited access to privileged areas needed to build solutions that provide Enterprise grade security.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
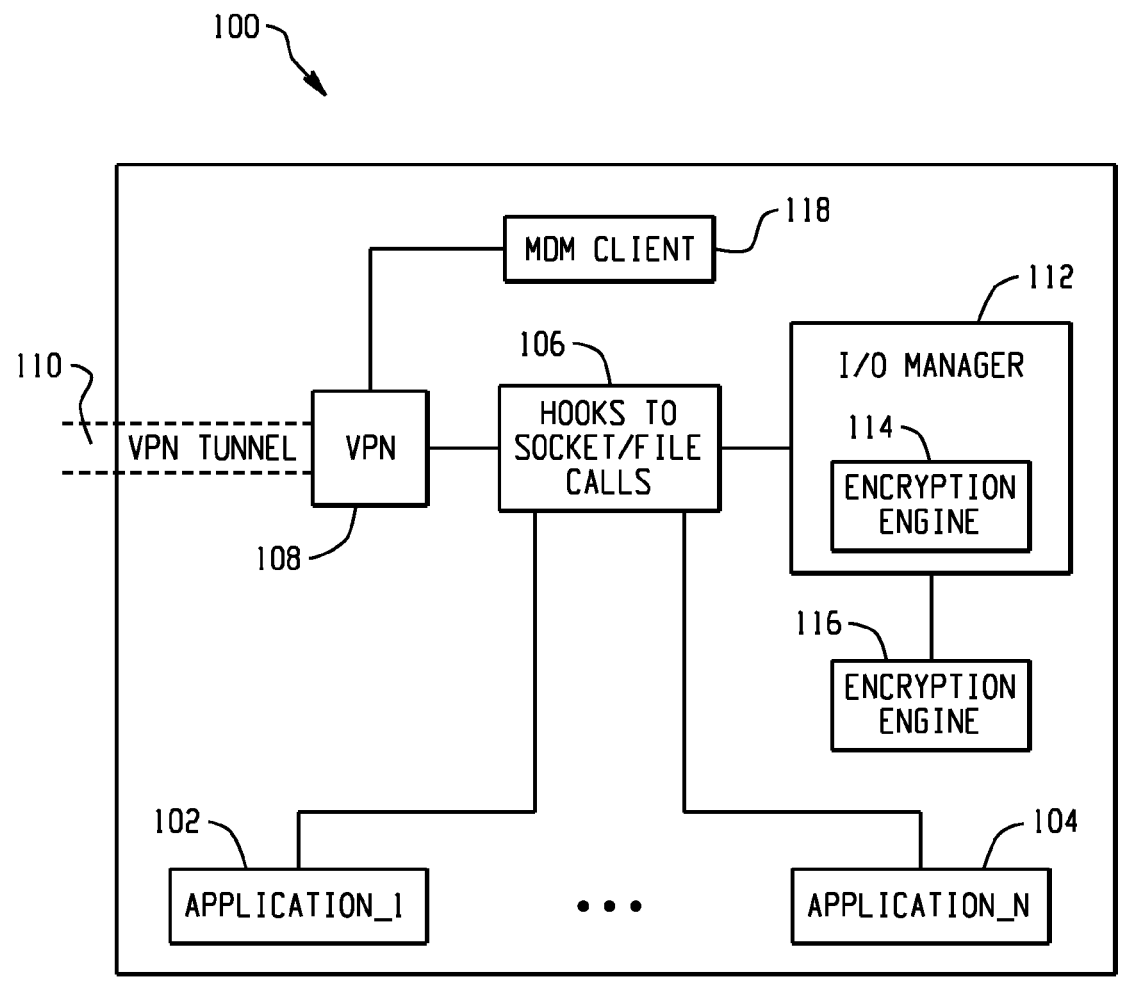
FIG. 1 is a functional block diagram illustrating an example of a multiple application container in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment herein, there is described a Multiple Application Container. Various embodiments of the Multiple Application Container may include, but are not limited to: (1) managed intranet access via a dedicated Virtual Private Network (VPN) tunnel shared amongst applications within the container, (2) managed file/data encryption, (3) native look and feel applications for the base Operating System (OS), (4) isolation from any non-OS based services on the device, and/or (5) Mobile Device Management (MDM) based capabilities, such as policy enforcement.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a Multiple Application Container. Various embodiments of the Multiple Application Container may include, but are not limited to: (1) managed intranet access via a dedicated Virtual Private Network (VPN) tunnel shared amongst applications within the container, (2) managed file/data encryption, (3) native look and feel applications for the base Operating System (OS), (4) isolation from any non-OS based services on the device, and/or (5) Mobile Device Management (MDM) based capabilities, such as policy enforcement.

In an example embodiment, the socket call function interfaces are monitored and redirected as needed to the VPN tunnel to bring VPN access into applications. For example, Seamless Secure Access (SSA), which is a user-space library built upon the code base of AnyConnect™ available from Cisco Systems, Inc., 170 West Tasman Dr., San Jose, Calif. 95134 (the assignee of this application) can be employed to provide the ability to bring VPN access into applications. Since SSA is already managing a tunnel to the corporate network, the redirected traffic is capable of passing into the intranet securely via an Adaptive Security Appliance (ASA).

In an example embodiment, file and data interfaces are monitored, and traffic to these interfaces is redirected to an encrypted file manager. The encrypted file manager presents the state of these files in a manner consistent with how an application would expect to receive from the system, while at the backend writing encrypted data to disk. This means that the applications will deal with file/disk access exactly as they do today, and will be completely unaware that the data is encrypted.

The encrypted file I/O can be applied to all file accessed from the container, making exceptions for system files that are opened as read only. Otherwise all file data will reside in the container and will be encrypted using supported (configurable) ciphers. Additionally, the keys can be stored at the enterprise (or a predefined) network and therefore, enterprise access is needed for key retrieval. However, a policy could also dictate some form of "offline" or "airplane" mode configuration, which would enable a client to access the local data while VPN access to the enterprise network is unavailable by storing the keys locally for a predefined period of time.

In an example embodiment, the applications within the container are still applications native to the OS for which they were written and published. This means that the applications are capable of taking advantage of all the basic functionalities of the core OS itself, and will still appear to the user in the way intended by the original developers/publishers, except that if a VPN tunnel has not been established before the application is launched, the user will be presented with User Interface (UI) screens for obtaining the users authentication credentials.

In an example embodiment, the container is isolated from non OS services on the device. Certain utilities may be added to the scope of the container in order to fill in the missing pieces on given platforms. For example, if the OS utilizes a PDF (Portable Document Format) viewer that is designed as a separate application, then a PDF viewer will be provided within the container in order to track/manage any PDFs that an application is asked to load on screen. The PDF viewer within the container would be isolated from a PDF viewer that is outside the container. In particular embodiments that employ a plurality of containers, independent copies of an application may be provided to the plurality of containers. Moreover, a separate set of utilities may be provided based upon the specifics of the OS. These utilities could be delivered as part of the base container itself, or could be delivered as applications which are simply placed into the container in the same manner as other applications. In devices with multiple containers, separate VPN tunnels can be employed to isolate the containers.

In an example embodiment, the container is capable of being pushed or created via a Mobile Device Management (MDM) solution. Furthermore, the container itself is able to support interfaces consistent with those expected for MDM.

In an example embodiment, application packages/binaries for applications inside the container are statically modified and then pushed down via MDM. The modifications would inject hooks into the application to secure network and file I/O, and maintain MDM style interfaces/behavior.

In an example embodiment, OS constructs can be modified to facilitate isolating the applications in the container. For example, the "Binder" interface on the Android™ OS is driven by OS constructs called "Intents". Intents are the mechanism used to pass data between applications (including how PDFs are passed to system PDF viewers). Within the container, a namespace can be employed so that the Intents generated within the container resolve to intents within the container, and intents generated outside of the container do not permeate the container in any way.

FIG. 1 is a functional block diagram illustrating an example of a multiple application container 100 in accordance with an example embodiment. The multiple application container 100 comprises a plurality of applications 102, 104. Although the illustrated example displays two applications, those skilled in the art should readily appreciate that the multiple application container 100 may suitably comprise any physically realizable number of applications. For example, the multiple application container 100 may suitably comprise N applications, where N is an integer greater than one.

Socket and/or file calls from the applications 102, 104 are intercepted by hooks to socket/file calls 106. In an example embodiment, the hooks to socket/file calls 106 suitably comprise logic for intercepting network traffic and file input/output (I/O) and redirecting the traffic as described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, network traffic is intercepted by the hooks to socket/file calls 106 and redirected to VPN logic 108 that forwards the network traffic to a predefined network via a VPN tunnel 110. The VPN logic 108 establishes the VPN tunnel 110 with the predefined network (for example, an enterprise network associated with a user). In an example embodiment, the VPN tunnel 110 is shared exclusively by the applications 102, 104 within the multiple application container 100. Applications that are outside of the multiple application container 100 are excluded from the VPN tunnel 110.

In an example embodiment, file I/O traffic from the applications 102, 104 within the multiple application container 100 are intercepted by the socket hooks 106 and redirected to the file I/O manager 112. The file I/O manage 112 may suitably comprise an encryption engine 114, or the encryption engine 116 may be coupled with file I/O manager 112. The file I/O manager 112 may determine whether data being read or written by the requesting application should be encrypted. In an example embodiment, data being read or written is decrypted or encrypted respectively, except for data retrieved from system files that are opened in Read Only mode. Data that is to be encrypted or decrypted is routed through encryption engine 114.

In an example embodiment, the VPN logic 108 isolates networked data that was not received via the VPN tunnel from applications 102, 104 within the multiple application container 100. This ensures that the data that applications 102, 104 received was from the predefined network, and not an outside, potentially rogue source.

In an example embodiment, the VPN logic 108 isolates other applications on the same device (not shown) as the mobile application container 100 from the VPN tunnel. This, can prevent the other applications on the device from gaining access to the predefined network.

In an example embodiment, the VPN logic 108 establishes the VPN tunnel 110 responsive to the launching of one of the plurality of applications 102, 104 in the multiple application container 100. When an application is launched, the VPN logic 108 determines whether the VPN tunnel 110 has been established, and if the tunnel has not been established, the VPN logic 108 attempts to establish the VPN tunnel. Access to the network is denied to the launched application until the VPN tunnel 110 is established.

The file I/O manager 112 may be coupled with any suitable storage device. For example, the file I/O manager 112 is coupled with a local disk. In another example embodiment, the file I/O manager 112 is coupled with a secure digital (SD) memory card. In particular embodiments, the file I/O manager 112 may be coupled to both a local desk and a SD memory card.

In an example embodiment, the keys employed by the encryption engine 116 are stored on the predefined network in communication with the multiple application container 100 via the VPN tunnel 110. In particular embodiments, data representative of the keys are stored locally by the file I/O manager 112 for a predetermined time period after the VPN tunnel 110 has been torn down. For example, if the device is being operated in airplane mode, the keys may be stored by file I/O manager 112 to allow applications 102, 104 file access while the device is in airplane mode. However, the keys may be discarded if the device does not reconnect with the predefined network within the predetermined time period (for example, 12 hours).

In an example embodiment, the multiple application container 100 further comprises a mobile device management client 118. The mobile device management (MDM) client 118 may be any suitable client for configuring the multiple application container. For example, the Open Mobile Alliance (OMA) specifies a device management protocol call the OMA Device Management (DM) protocol. The current specification of the OM ADM is version 1.2 released on Apr. 2, 2006. In particular embodiments, the mobile device management client 118 is operable to accept commands received via the VPN tunnel 110, and ignore commands that were not received via the VPN tunnel 110.

Figure 2:
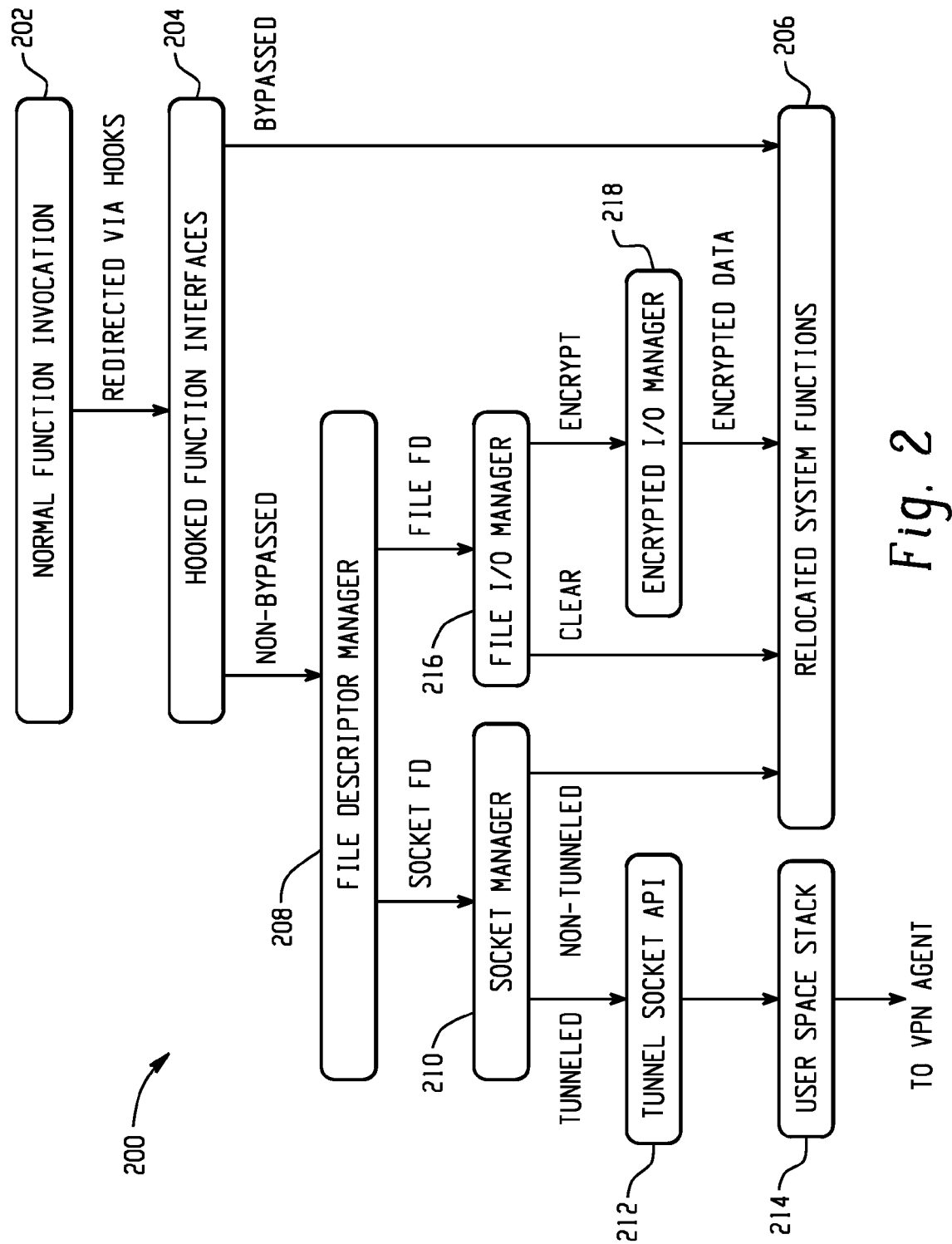
FIG. 2 illustrates an example of a socket and file application program interface layout.

FIG. 2 illustrates an example of a socket and file application program interface (API) layout 200. When an application within the multiple application container makes a system call, the system call is redirected by the normal function invocation 202 to the hooked function interfaces 204. If the system call is not a socket call or a file I/O request, the system call is forwarded to the relocated system functions 206.

Socket calls and file I/O requests are forwarded to the file descriptor (FD) manager 208. If the system call is a socket call, the system call is forwarded to the socket manager 210. The socket manager 210 determines whether the system call is to be tunneled to a predefined network. If the system call is not being tunneled to the predefined network, the call is forwarded to the relocated system functions 206. If the socket call is being tunneled to the predefined network, the call is routed through the tunnel socket API 212, user space stack 214 and to a VPN agent (not shown).

If the system call is for a file I/O, file descriptor manager 208 routes the call to the file I/O manager 216. The file I/O manager 216 determines whether data associated with the system call should be encrypted. If the data is not being encrypted, the data is forwarded to the relocated system functions 206. If the data is being encrypted, the data is forwarded to the encryption I/O manager 218 and then to relocated system functions 206.

Figure 3:
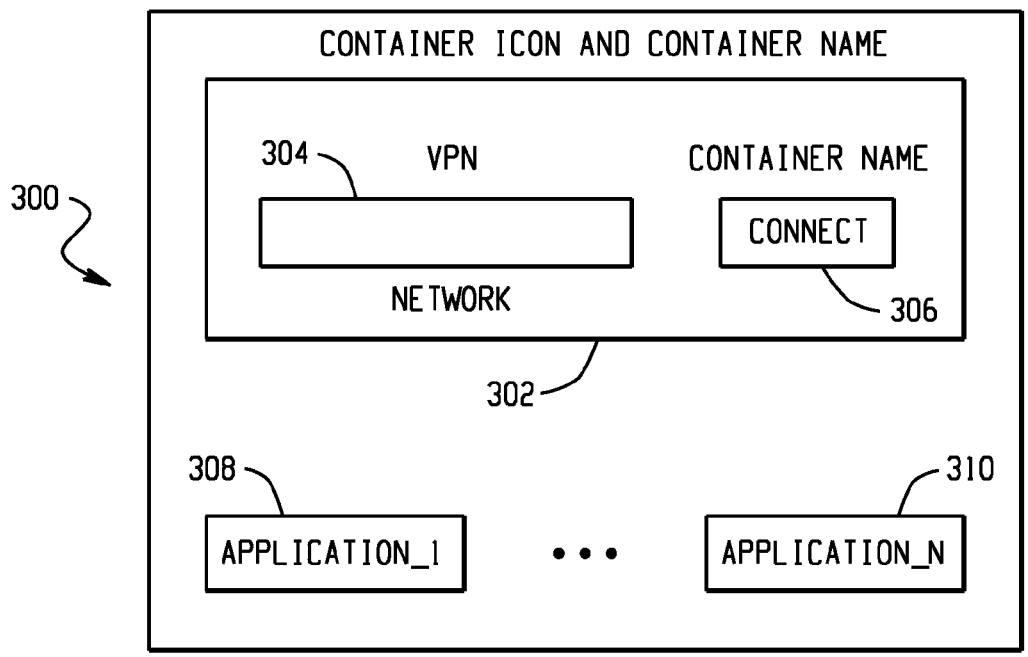
FIG. 3 illustrates an example of a user interface for establishing a virtual private network (VPN) tunnel for the multiple application container.

FIG. 3 illustrates an example of a user interface 300 for establishing a virtual private network (VPN) tunnel for the multiple application container. The user interface 300 comprises a VPN connection screen 302. In the illustrated example, the VPN connection screen 302 comprises a network field 304 for receiving the network address of the predefined network and a connect button 306. A user may enter data representative of the network address into the network field 304 and select the connect button 306 to initiate establishment of the VPN tunnel. The user interface 300 further comprises icons 308, 310 corresponding to the applications within the container.

In an example embodiment, when a user selects one of icons 308, 310 to launch an application, if the VPN tunnel (e.g., VPN tunnel 110 in FIG. 1) has not yet been established, the user will be prompted to connect to the predefined network via VPN connection screen 302.

Figure 4:
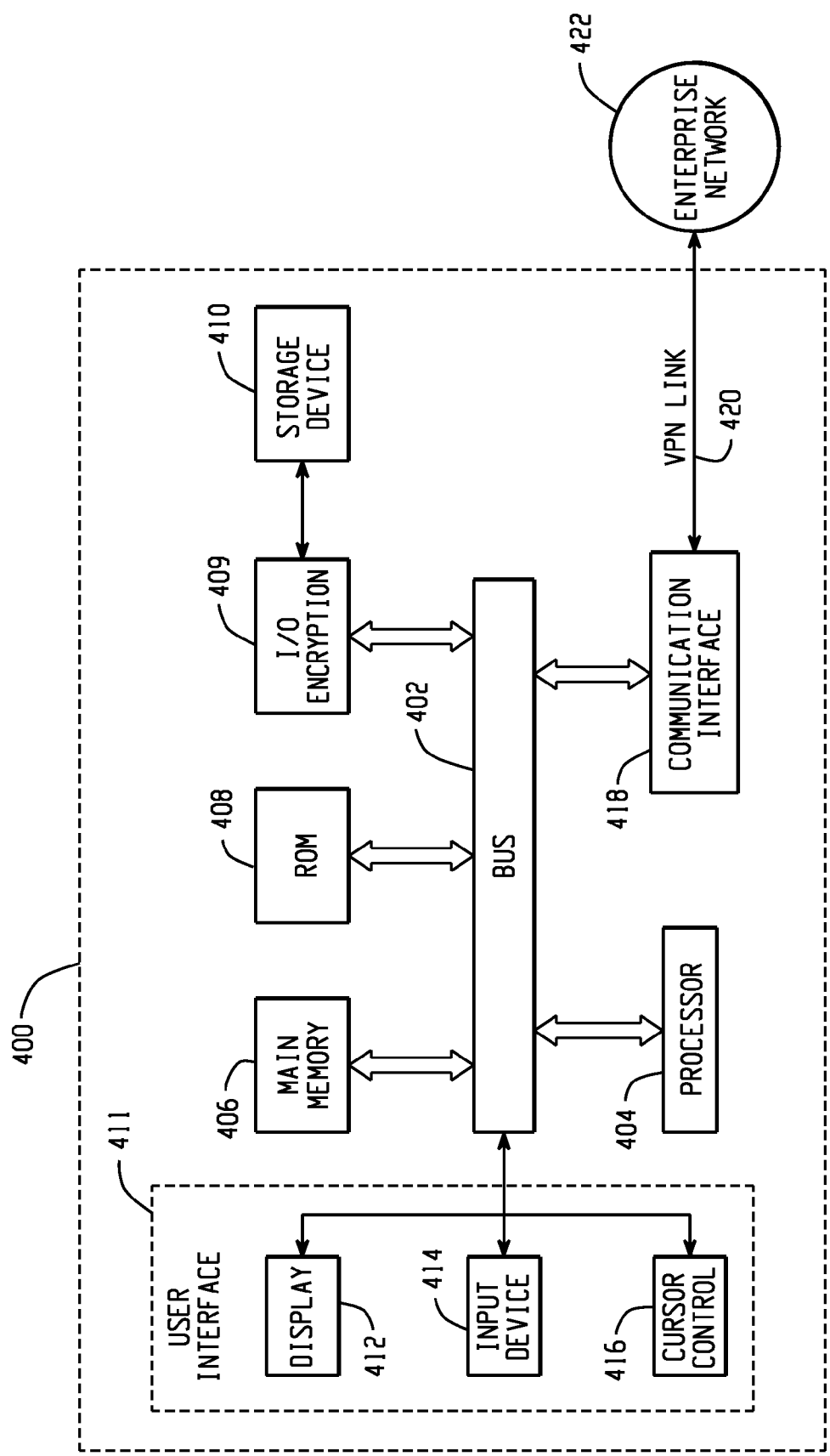
FIG. 4 illustrates an example of a computer system upon which an example embodiment may be implemented.

FIG. 4 illustrates an example of a computer system 400 upon which an example embodiment may be implemented. Computer system 400 is suitable for implementing the functionality of the multiple access container 100 described herein in FIG. 1, the socket and file API layout described herein in FIG. 2, and/or the user interface 300 described herein in FIG. 3.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, SD memory and/or flash storage, is provided and coupled to bus 402 for storing information and instructions. In the illustrated embodiment, the storage device is coupled with bus 402 via an I/O encryption engine 409. The I/O encryption engine 409 encrypts writes to the storage device 410 and decrypts reads from the storage device 410.

Computer system 400 may be coupled via bus 402 to a user interface 411. The user interface 411 may comprise a display 412, such as a cathode ray tube (CRT) or liquid crystal display (LCD), for displaying information to a computer user. The user interface 411 may further comprise an input device 414, such as a keyboard including alphanumeric and other keys is coupled to bus 402 for communicating information and command selections to processor 404. Another type of user input device is cursor control 416, such as a mouse, a trackball, cursor direction keys, and/or a touchscreen for communicating direction information and command selections to processor 404 and for controlling cursor movement on display 412. This input device typically has two degrees of freedom in two axes, a first axis (e.g., x) and a second axis (e.g., y) that allows the device to specify positions in a plane.

An aspect of the example embodiment is related to the use of computer system 400 for multiple application containerization in a single container. According to an example embodiment, multiple application containerization in a single container is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, and volatile media. Non-volatile media include, for example, optical or magnetic disks, such as storage device 410. Volatile media include dynamic memory, such as main memory 406. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions.

The instructions received by main memory 406 may optionally be stored on storage device 410 either before or after execution by processor 404.

Computer system 400 also includes a communication interface 418 coupled to bus 402. Communication interface 418 provides a two-way data communication coupling computer system 400 to a VPN link 420 that is connected to an Enterprise (or other predefined network 422. In an example embodiment, VPN link 420 is a wireless link.

Figure 5:
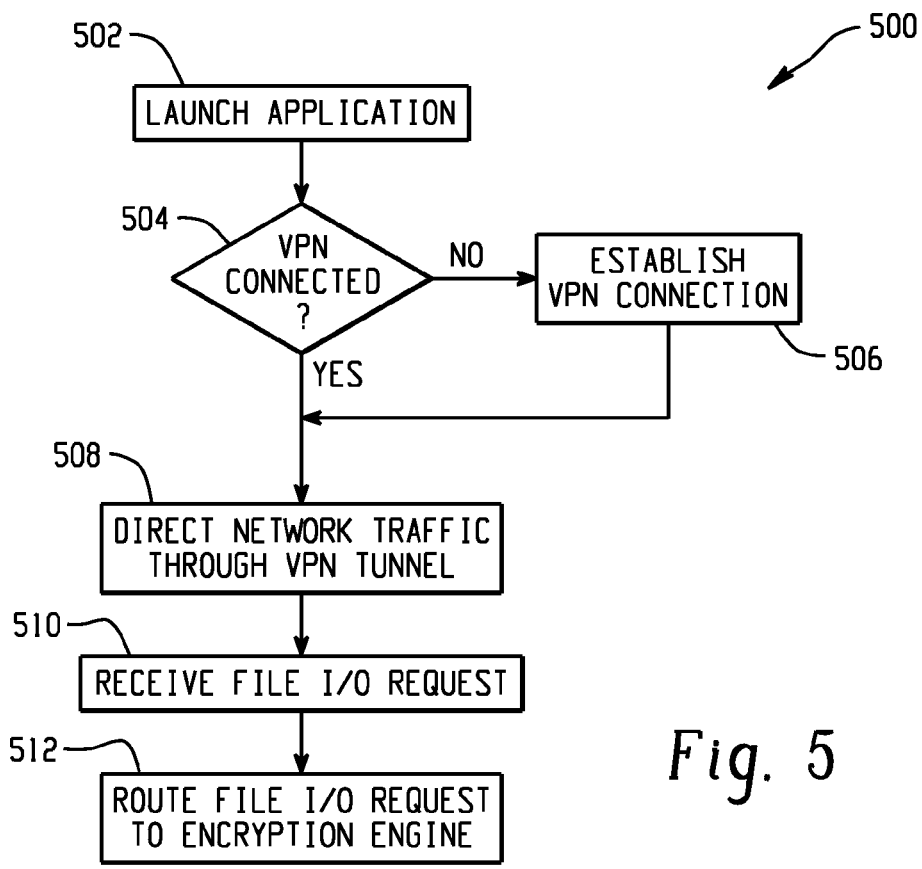
FIG. 5 illustrates an example of a method of operation for a multiple application container.

In view of the foregoing structural and functional features described above, a methodology 500 in accordance with an example embodiment will be better appreciated with reference to FIG. 5. While, for purposes of simplicity of explanation, the methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement the methodology 500 in accordance with an example embodiment. The methodology 500 described herein is suitably adapted to be implemented in hardware, software, or a combination thereof. For example, the methodology 500 may be implemented by logic in multiple application container 100 (FIG. 1) and/or computer system 400 (FIG. 4).

At 502, an application from within a multiple application container is launched. In the illustrated embodiment, an assumption is made that the application will be requesting connectivity to a network.

At 504, a determination is made whether the multiple application container is coupled with a predefined (e.g., enterprise) network. If, at 504, a determination is made that a connection with the predefined network has not been established (NO), at 506 a VPN connection, or tunnel, is established with the network. In an example embodiment, the application will be blocked from accessing the network until the VPN connection has been established. If, at 504, a determination was made that the VPN connection has already been established (YES), processing may continue to 508.

At 508, network traffic is directed through the VPN tunnel. Network traffic directed to the network is intercepted via hooks in the system function API and redirected to the VPN tunnel. Incoming network traffic is limited to traffic received via the VPN tunnel.

At 510, a file I/O request is received. The file I/O request may be a read request or a write request. The request may be directed to any suitable type of storage device such as a local disk, SD memory, etc.

At 512, the file I/O request is routed to an encryption engine. The encryption engine encrypts/decrypts data to/from the storage device.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a display device;
   an input device; and
   a multiple application container that comprises socket monitoring and redirect logic, virtual private network (VPN) logic, and file input/output (I/O) logic;
   wherein, responsive to a request to launch an associated requested application, the VPN logic selectively generates on the display device a prompt for an associated user of the apparatus to provide a credential for establishing a VPN tunnel with an associated network;
   wherein the VPN logic selectively receives, by the input device, the user credential from the associated user of the apparatus;
   wherein, responsive to receiving the user credential, the VPN logic establishes the VPN tunnel with the associated network that is shared by a first set of associated applications comprising the associated requested application within the multiple application container;
   wherein the VPN logic excludes from the VPN tunnel data traffic between the associated network and associated applications stored on the apparatus other than the first set of associated applications within the multiple application container;
   wherein the socket monitoring and redirect logic redirects data traffic between the associated network and the first set of associated applications within the multiple application container through the VPN tunnel;
   wherein the socket monitoring and redirect logic redirects file input and output traffic between an associated storage device and the first set of associated applications within the multiple application container through the file I/O logic, the file I/O logic encrypting file output traffic using data representative of keys before writing to the associated storage device; and
   wherein the VPN logic isolates from the first set of associated applications within the multiple application container the data traffic excluded from the VPN tunnel between the associated network and the associated applications stored on the apparatus other than the first set of associated applications within the multiple application container.

2. The apparatus set forth in claim 1, wherein the VPN logic isolates networked data that was not received via the VPN tunnel from the first set of associated applications within the multiple application container.

3. The apparatus set forth in claim 1, wherein when the VPN logic establishes the VPN tunnel responsive to the launching of one of the plurality of the first set of associated applications in the multiple application container and determining that the VPN tunnel has not been established.

4. The apparatus set forth in claim 1, wherein the associated storage device is a local disk.

5. The apparatus set forth in claim 1, wherein the associated storage device is a secure digital memory card.

6. The apparatus set forth in claim 1, wherein the keys employed by the file I/O logic are stored on the associated network.

7. The apparatus set forth in claim 6, wherein data representative of the keys are stored locally by the file I/O logic for a predetermined time period after the VPN tunnel has been torn down.

8. The apparatus set forth in claim 1, wherein the multiple application container further comprises a mobile device management client.

9. The apparatus set forth in claim 8, wherein the mobile device management client is operable to accept commands received via the VPN channel, and ignore commands that were not received via the VPN tunnel.

10. Logic encoded in a tangible non-transitory computer readable medium for execution by a processor, and when executed operable to:
- selectively generate, on an associated display device, a prompt for an associated user of the logic to provide a credential for establishing a VPN tunnel with an associated network;
- selectively receive, by an associated input device, the user credential from the associated user of the logic responsive to a request to launch an associated requested application;
- responsive to receiving the user credential, selectively establish a virtual private network (VPN) tunnel with the associated network that is shared by a first set of associated applications comprising the associated requested application within in a multiple application container;
- exclude from the VPN tunnel data traffic between the associated network and associated applications stored on the apparatus other than the first set of associated applications within the multiple application container;
- redirect data traffic between the associated network and the first set of associated applications within the multiple application container through the VPN tunnel;
- redirect file input and output requests between an associated storage device and the first set of associated applications within the multiple application container to a predefined encryption engine; and
- isolate from the first set of associated applications within the multiple application container the data traffic excluded from the VPN tunnel between the associated network and the associated applications stored on the apparatus other than the first set of associated applications within the multiple application container.

11. The logic set forth in claim 10, further operable to obtain keys for the file input and output requests from the associated network via the VPN tunnel.

12. The logic set forth in claim 11, further operable to store data representative of the keys locally for a predetermined time period after the VPN tunnel has been torn down.

13. The logic set forth in claim 10, further operable to establish the VPN tunnel responsive to the launching of one of the plurality of the first set of associated applications in the multiple application container and determining that the VPN tunnel has not been established.

14. The logic set forth in claim 10, further operable to isolate the associated applications other than the first set of associated applications that are not in the multiple application container from the VPN tunnel.

15. logic set forth in claim 10, further operable to respond to mobile device management commands.

16. The logic set forth in claim 15, further operable to ignore mobile device management commands that were not received via the VPN tunnel.

17. A method, comprising:
- selectively generating, on an associated display device, a prompt for an associated user to provide a credential for establishing a VPN tunnel with an associated network;
- selectively receiving, by an associated input device, the user credential from the associated user responsive to a request to launch an associated requested application;
- responsive to receiving the user credential, selectively establishing a virtual private network (VPN) tunnel with an associated network for a first set of associated applications comprising the associated requested application contained within a multiple application container;
- excluding from the VPN tunnel data traffic between the associated network and associated applications stored on the apparatus other than the first set of associated applications within the multiple application container;
- redirecting data traffic between the associated network and the first set of associated applications within the multiple application container through the VPN tunnel;
- receiving a file output request with data from a selected application of the first set of associated applications within the multiple application container;
- encrypting the data in the file output request prior to writing the data; and
- isolating from the first set of associated applications within the multiple application container the data traffic excluded from the VPN tunnel between the associated network and the associated applications stored on the apparatus other than the first set of associated applications within the multiple application container.

18. The method of claim 17, further comprising:
- launching a selected application of the first set of associated applications within the multiple application container;
- determining whether the VPN tunnel has been established responsive to launching the selected application; and
- wherein establishing the VPN tunnel is responsive to determining the VPN tunnel has not been established and the application being launched.

* * * * *

UNITED STATES PATENT AND TRADEMARK OFFICE
CERTIFICATE OF CORRECTION

PATENT NO. : 9,032,506 B2
APPLICATION NO. : 13/570724
DATED : May 12, 2015
INVENTOR(S) : Parla et al.

It is certified that error appears in the above-identified patent and that said Letters Patent is hereby corrected as shown below:

In the Claims:

Column 8, Claim 9, Line 66, please delete "channel" and insert --tunnel-- therefor;

Column 10, Claim 15, Line 3, please insert --The-- before logic.

Signed and Sealed this
Twentieth Day of October, 2015

Michelle K. Lee
*Director of the United States Patent and Trademark Office*